Figures 1, 2:
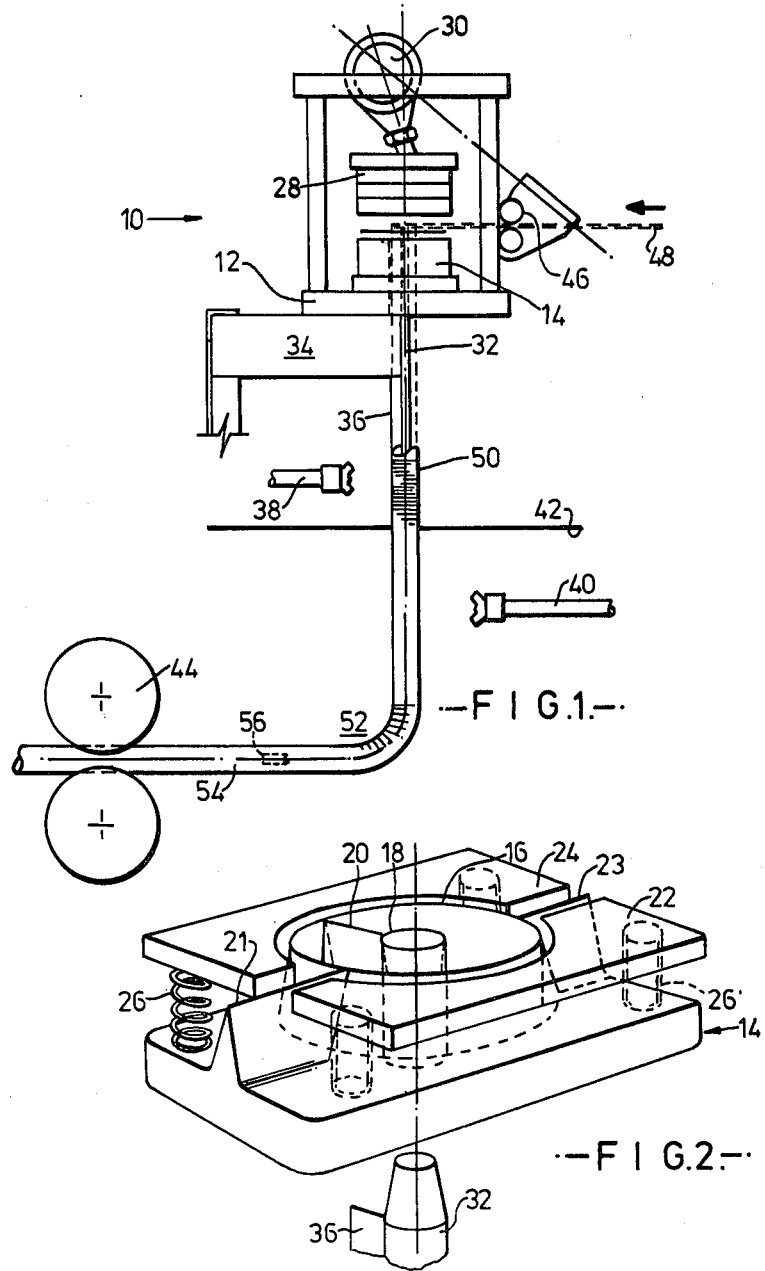

United States Patent [19]

Lupton et al.

[11] 4,282,053

[45] Aug. 4, 1981

[54] TUBE FORMING APPARATUS AND METHOD

[75] Inventors: Donald B. Lupton, Colne; Kenneth Lawrence, Baildon, both of England

[73] Assignee: PH Thermal Products Limited, West Yorkshire, England

[21] Appl. No.: 69,913

[22] Filed: Aug. 27, 1979

[30] Foreign Application Priority Data

Sep. 13, 1978 [GB] United Kingdom ............... 36729/78

[51] Int. Cl.³ ............................................. B32B 31/04
[52] U.S. Cl. ...................................... 156/264; 118/37; 156/278; 156/512; 156/513; 156/529; 427/284; 427/292
[58] Field of Search .................. 427/290, 292, 284; 118/37; 156/512, 513, 529, 264, 278, 305; 138/149, 156; 83/97

[56] References Cited

U.S. PATENT DOCUMENTS

| | | | |
|---|---|---|---|
| 1,029,652 | 6/1912 | White | 138/156 X |
| 2,769,741 | 11/1956 | Schwartz | 427/290 X |
| 2,980,572 | 4/1961 | Bagdon et al. | 156/305 X |
| 2,995,172 | 8/1961 | Glatt | 156/305 X |
| 3,149,516 | 9/1964 | Caldwell et al. | 83/97 |
| 4,204,380 | 5/1980 | Bergmann et al. | 156/512 X |

FOREIGN PATENT DOCUMENTS

2014555 11/1970 Fed. Rep. of Germany ........... 138/149

OTHER PUBLICATIONS

Stanley, Frank A., *Punches and Dies*, New York, McGraw-Hill Book Company, Inc., 1950, pp. 159–160.

*Primary Examiner*—Evan K. Lawrence
*Attorney, Agent, or Firm*—Diller, Ramik & Wight

[57] ABSTRACT

Apparatus for forming a tube, preferably of flexible thermally insulating material, comprises a cutting head 14 with a pair of concentric cutting edge 16, 18 which cooperates with a presser head 28 to cut rings 50 of material from a sheet 48 presented to the cutting head. The rings are stacked up on a guide bar 32 and sprayed with a coating composition to consolidate them into a tube which may be collected on a take-up drum in a continuous manner.

37 Claims, 2 Drawing Figures

TUBE FORMING APPARATUS AND METHOD

This invention relates to an apparatus and method for making tubes, particularly tubes of flexible thermally insulating material suitable for use as pipe insulation.

In our copending U.K. Patent Application No. 2628/77 (German Offenlegungsschrift No. 2800792) there is disclosed insulation for lagging pipes which comprises a plurality of right cylindrical elements of inorganic fibres held together by a surface coating of a flexible material, the elements having a bore therein in which the pipe is to be located and the fibres in the elements lying substantially in planes perpendicular to the cylindrical axis thereof. In the preferred form of the insulation, a plurality of right cylindrical elements are connected together into a tubular length of pipe lagging having a common outer cover.

The invention seeks to provide an apparatus which is capable, inter alia, of making continuous lengths of the above insulation.

According to the present invention there is provided an apparatus which comprises a pair of concentric cutting edges mounted above a guide bar, means for pressing a sheet of material against the cutting edges to cut a ring of material and means for coating the cut rings of material on the guide bar.

The invention also provides a method of making tubes which comprises feeding a sheet of material to a cutting zone, cutting rings of the material, passing the rings along a guide bar, coating the surfaces of the rings on the guide bar, and collecting the tube so-formed.

The sheet of material is preferably an inorganic fibre batt, e.g. glass fibre, and ideally most or all of the fibres in the sheet lie substantially in the plane of the sheet.

The concentric cutting edges preferably have a radially directed interconnected cutting edge so that the rings cut each have a radial slit. In this case the guide bar preferably has a radially directed longitudinal guide fin which will have the effect of aligning the slits in successive rings so that the tube finally produced has a radial slit along its whole length.

The guide bar passes through the bores in the rings formed by the inner concentric cutting edge.

The means for pressing the sheet of material against the cutting edges is preferably a plate, profiled with recesses to the shape of the cutting edges and, ideally, surfaced with a hard-wearing resilient material. The pressing of the plate may be in timed relationship with the feed of sheet material so that a fresh portion of the sheet is presented for each successive cut. In this case the sheet may be fed by means such as a conveyor or feed rollers geared to the pressing means.

As indicated in our copending application referred to above, the coating material is preferably a liquid coating which sets to a flexible coat and which may be applied by dipping, brushing or spraying, especially the latter. Hence the coating means may suitably comprise one or more spray nozzles capable of spraying the coating medium on to the rings passing along the guide bar. The nozzles may be stationary or rotatable about the tube. Depending on the coating material employed, a subsequent heating zone for curing or drying of the coating may be provided. The length of the guide bar should be such that the chosen coating material has cured or set sufficiently to hold the tube intact when it leaves the bar and is collected, e.g. on a take-up drum.

Preferred coating materials include natural or synthetic rubbers or other resinous synthetic materials, for example polyvinylchloride, polyolefines, acrylates, nitrile, thiol, silicone, urethane or chloroprene rubbers, polytetrafluoroethylene or a combination thereof.

The invention will be described further, by way of example, with reference to the accompanying drawings, in which:

FIG. 1 is diagramatic side elevational view of part of an apparatus constructed according to the invention; and FIG. 2 is perspective view, on an enlarged scale, of the cutting mechanism.

Referring to the drawings, the apparatus 10 comprises a frame 12 on which a cutting head or cutting head assembly 14 is mounted. The cutting head is shaped to provide two concentric cutting edges 16, 18 joined by a radially directed cutting edge 20. Additional cutting edges 21, 23 are provided outside the outer edge 16. Above the cutting head 14 are positioned a pair of support plates 22, 24 carried on spring mountings 26. A presser head 28 having a lowermost plate (unnumbered) is eccentrically driven from a shaft 30 so as to reciprocate above the cutting head assembly 14.

Below the cutting head 14 there is located a guide bar 32 which comprises a length of piping supported by a support plate 34 and carrying a radially directed guide fin 36 down most of its length. Spray nozzles 38 and 40 are positioned on either side of the guide bar 32 with a baffle 42 located between. Driven rollers 44 having a surface of relatively soft material take the tubular product from guide bar 32 and feed to a take-up drum (not shown). Feed rollers 46 positioned immediately adjacent the cutting head 14 are geared to the shaft 30 in such a manner as to urge glass fibre sheet 48 into the cutting zone in timed relationship with the cutting operating. A vacuum extract device (not shown) is located adjacent the cutting zone to remove waste.

In operation, glass fibre in the form of a sheet slightly wider than the larger cutting edge 16 is fed stepwise into the cutting zone by the rollers 46 in timed relationship with the operation of the shaft 30 so that a fresh portion of the sheet is presented over the cutting head every time the presser head 28 descends. The sheet 48 is supported on the sprung plates 22, 24 and as the presser head descends the plates are pushed below the level of the cutting edges 16, 18, 20, 21, 23 allowing the sheet to be cut. The edges 16, 18, 20 produce radially slit rings which are successively pushed down through the cutting head 14, between the edges 16, 18 and on to the guide bar 32, the fin 36 locating and aligning the radial slits of the rings. As the presser head 28 rises, the plates 22, 24 rise under the action of their spring mountings 26 and raise the remainder of the cut sheet to its original level. The edges 21, 23 serve to sever the sheet completely across its width, so as the rollers 46 operate to present a fresh portion of sheet, the cut portion is pushed towards the vacuum extract device which removes the cut portion as waste. Successive cut rings 50 stack up on the guide bar 32 and are sprayed with a coating composition by the nozzles 38, 40. As the coating composition cures, in the zone 52, the rings become consolidated into a tube 54 having a radial slit along its length. The guide bar ends at 56 and the tube 54 is urged forward by the driven rollers 44 on to the take-up drum. The support plate 34 is in the plane of the fin 36 and thus the rings 50 are able to pass by virtue of their radial slits.

The apparatus of the invention may be used to produce pipe insulation in a continuous manner. Further, two or more cutting heads 14, with associated presser heads 28 and guide bars 32, may be provided side by side with common drive, feed and take-up systems. The waste may be recycled to produce fresh glass fibre sheet, or may be used as an insulating filling for other thermally insulating products.

It will be appreciated that although in the above description the presser head is moved while the cutting head is held stationary, in certain circumstances it may be preferable to hold the former stationary and move the latter.

We claim:

1. An apparatus which comprises a pair of concentric cutting edges mounted above and aligned with a guide bar along which a ring of material is adapted to be guided, means for pressing a sheet of material against the cutting edges to cut a ring of material and transfer said rings to said guide bar, and means for coating the cut rings of material on the guide bar.

2. An apparatus as claimed in claim 1 in which the cutting edges have a radially directed interconnecting cutting edge adapted to form a radial slit in each of the cut rings.

3. An apparatus as claimed in claim 2 in which the guide bar has a radially directed longitudinal guide fin for registering with each radial slit to guide the cut rings on the guide bar.

4. An apparatus as claimed in any of claims 1 to 3 in which the means for pressing the sheet of material against the cutting edges is a plate.

5. An apparatus as claimed in any claims 1 to 3 including means for feeding a sheet of material between said pressing means and said cutting edges, and the means for pressing the sheet of material against the cutting edges is operable in timed relationship with the sheet material feeding means so that a fresh portion of the sheet is presented for each successive cut.

6. An apparatus as claimed in claim 5 in which the sheet is fed by feed rollers geared to the pressing means.

7. An apparatus as claimed in any of claims 1 to 3 in which the means for coating the cut rings comprise one or more spray nozzles.

8. An apparatus as claimed in claim 7 in which the spray nozzles are arranged to rotate about the cut rings on the guide bar.

9. An apparatus comprising means for cutting successive rings from sheet material, means for guiding the rings for coaxial movement along a predetermined path of travel, and means for coating at least exterior circumferential surfaces of the rings during the movement thereof along the predetermined path.

10. The apparatus as defined in claim 9 including means for forming a radial through slit in each ring.

11. The apparatus as defined in claim 9 including means for forming a radial through slit in each ring, and means for maintaining alignment between all the slits of the rings during at least a portion of the movement of the rings along the predetermined path.

12. The apparatus as defined in claim 9 wherein each ring includes opposite annular faces, said guiding means effects face-to-face guiding movement of the rings along at least a portion of the predetermined path, and said coating means effects a tubular coating surrounding all of the rings and being bonded to the exterior circumferential surfaces thereof.

13. The apparatus as defined in claim 11 wherein each ring includes opposite annular faces, said guiding means effects face-to-face guiding movement of the rings along at least a portion of the predetermined path, and said coating means effects a tubular coating surrounding all of the rings and being bonded to the exterior circumferential surfaces thereof.

14. The apparatus as defined in claim 9 wherein said cutting means is a pair of concentric cutting edges.

15. The apparatus as defined in claim 9 wherein said guiding means is a guide bar.

16. The apparatus as defined in claim 14 wherein said cutting means is defined by means for pressing the sheet material against said cutting edges to cut a ring of material.

17. The apparatus as defined in claim 15 wherein said means for coating coat the cut rings of material on the 18. The apparatus as defined in claim 15 wherein said cutting means is a pair of concentric cutting edges.

19. The apparatus as defined in claim 18 wherein said cutting means is defined by means for pressing the sheet material against said cutting edges to cut a ring of material.

20. The apparatus as defined in claim 19 wherein said means for coating coat the cut rings of material on the guide bar.

21. An apparatus which comprises a pair of concentric cutting edges, pressing means disposed for opposing said pair of concentric cutting edges, means for feeding a sheet of material in a first direction between said pair of concentric edges and said pressing means, means for moving at least one of said pair of concentric cutting edges and said pressing means from a first spaced position to a second relatively more adjacent position during which movement a ring of material is cut from said sheet of material, means for guiding each cut ring of material in a second direction generally normal to said first direction substantially immediately upon the ring of material being cut from the sheet of material, said guiding means being a guide bar in generally internal telescopic relationship to the cut ring and including a portion disposed in generally coaxial relationship to said concentric cutting edges, and means for coating an exterior peripheral surface of the cut ring of material while the latter is on the guide bar.

22. The apparatus as defined in claim 21 wherein said concentric cutting edges are located between said opposing means and said guide bar portion.

23. The apparatus as defined in claim 21 wherein said concentric cutting edges are located between said opposing means and said guide bar portion, and said concentric cutting edges are located vertically above said guide bar portion.

24. The apparatus as defined in claim 21 including means between said concentric cutting edges for cutting a radial slit in each ring generally simultaneously with the cutting of each ring from the sheet of material and generally simultaneously with the relative movement of said concentric cutting edges and said opposing means toward said second relatively more adjacent positions.

25. The apparatus as defined in claim 21 including means for forming a radial through slit in each cut ring, and means for both supporting said guide bar and for maintaining alignment between all the slits of all cut rings during at least a portion of the movement of the cut rings in said second direction along said guide bar.

26. The apparatus as defined in claim 9 including means for feeding sheet material along a first path of travel in a first direction to said cutting means, said cutting means having first and second cooperative portions disposed at generally opposite sides of said first path, means for repetitively moving at least one of said first and second cooperative cutting portions from a first spaced position to a second relatively more adjacent position, during which movement successive rings of material are cut from said sheet of material, guide means in the form of a guide bar having an entrance end portion immediately adjacent to said cutting means and externally telescopically receiving thereon each ring, said guide bar entrance end portion being positioned generally normal to said first direction whereby said guide bar entrance portion guides each ring along a second path generally normal to said first path and in a second direction away therefrom, and the relative movement of said cooperative cutting portions during movement toward said second relatively more adjacent position is in said second direction.

27. The apparatus as defined in claim 26 wherein said second direction is vertical downward.

28. A method of making tubes which comprises feeding a sheet of material to a cutting zone, cutting rings of the material, passing the rings in face-to-face relationship along a guide bar, coating the exterior surfaces of the rings on the guide bar to form a continuous tube, and collecting the tube so-formed.

29. A method as claimed in claim 28 in which the material is an inorganic fibre batt in which most or all of the fibres lie in the plane of the sheet.

30. A method as claimed in claim 29 in which the sheet is of glass fibres.

31. A method as claimed in any of claims 28 to 30 in which the surfaces are coated with a material selected from natural or synthetic rubbers or other synthetic resinous materials.

32. A method as claimed in any of claims 28 to 30 in which the surfaces are coated by spraying.

33. A method comprising the steps of cutting successive rings from sheet material, guiding the rings for coaxial movement along a predetermined path of travel, and coating at least exterior circumferential surfaces of the rings during the movement thereof along the predetermined path.

34. The method as defined in claim 33 including the step of forming a radial through slit in each ring prior to said guiding.

35. The method as defined in claim 33 including the step of forming a radial through slit in each ring, and maintaining alignment between all the slits of the rings during at least a portion of the movement of the rings along the predetermined path.

36. The method as defined in claim 33 wherein each ring includes opposite annular faces, the guiding step effects face-to-face guiding movement of the rings along at least a portion of the predetermined path, and the coating step effects the formation of a tubular coating surrounding all of the rings and being bonded to the exterior circumferential surfaces thereof.

37. The method as defined in claim 35 wherein each ring includes opposite annular faces, the guiding step effects face-to-face guiding movement of the rings along at least a portion of the predetermined path, and the coating step effects the formation of a tubular coating surrounding all of the rings and being bonded to the exterior circumferential surfaces thereof.

* * * * *